Jan. 31, 1950
J. A. SPENCER
2,495,828
PHASING DEVICE FOR MOTOR STATORS
Filed Nov. 29, 1945
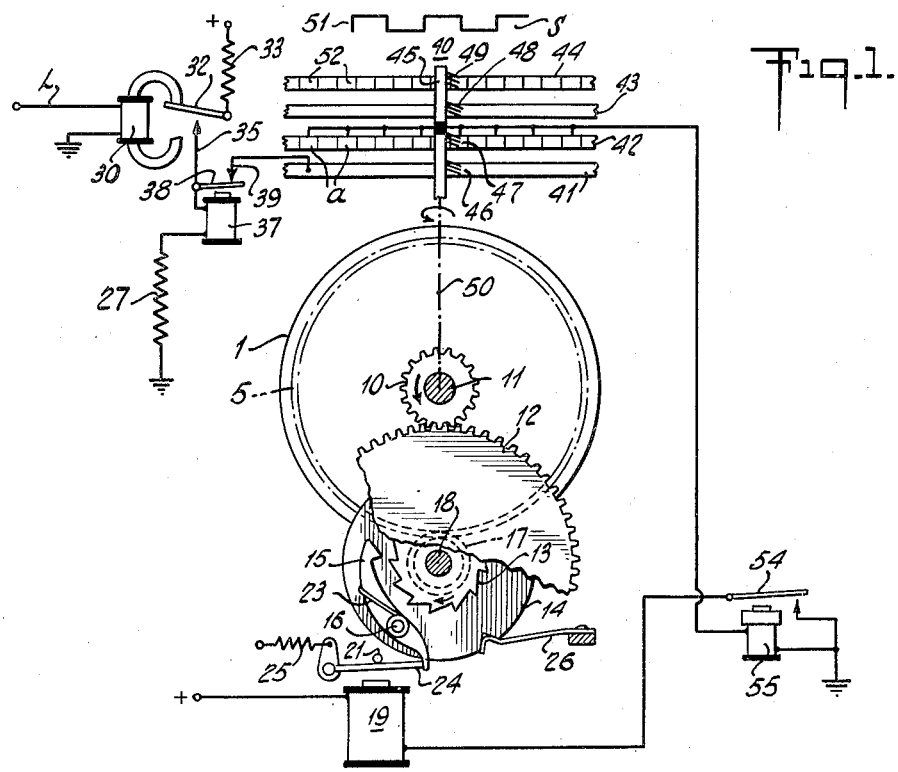
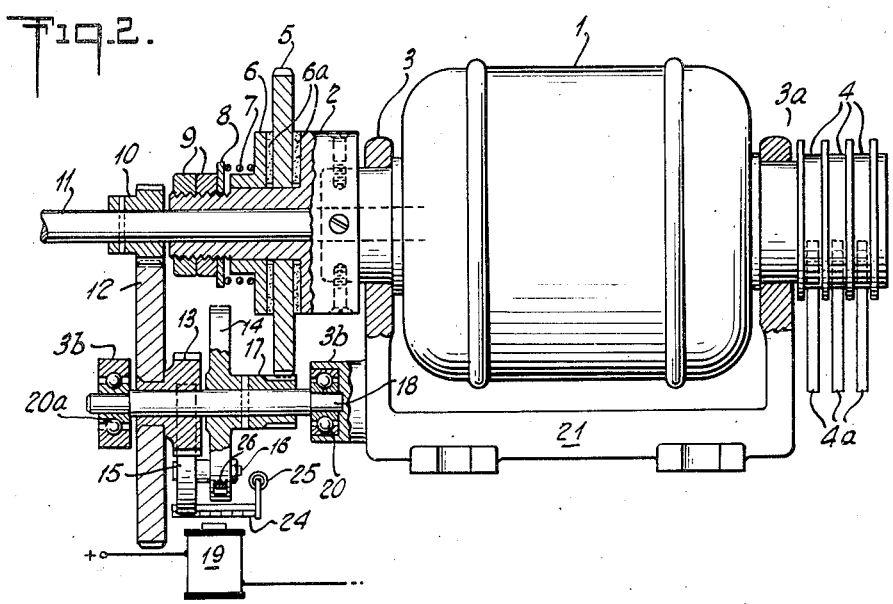
INVENTOR
JAMES A. SPENCER.
BY
H. S. Grover
ATTORNEY Patented Jan. 31, 1950

2,495,828

UNITED STATES PATENT OFFICE 2,495,828

PHASING DEVICE FOR MOTOR STATORS

James A. Spencer, Teaneck, N. J., assignor to Radio Corporation of America, a corporation of Delaware Application November 29, 1945, Serial No. 631,733

10 Claims. (Cl. 178—69.5)

This invention relates to a phase corrector such as may be employed, for example, in maintaining synchronism between two rotating members, at the transmitter and receiver respectively, in a synchronous telegraph system. The rotating members may be distributor brushes, or cams for cyclic circuit closing operations, or rotatable reactors such as disclosed in U. S. Patent 2,275,974 which issued March 10, 1942 to Richard E. Mathes. Other uses, however, will suggest themselves to those skilled in the art.

In multiplex telegraph and analogous systems, it is necessary to correct the speed or phase of the distributor or other periodic device in order to correctly translate the code elements of an incoming train of telegraph signals. There are numerous known systems of phase or speed correction, some of which operate, as in the instant case, to accelerate or retard the shaft of a driving motor and the rotating member coupled thereto whenever the angular displacement of a rotor requires restoration to proper phase. I have found, however, that certain advantages reside in the type of mechanical motor stator phasing device which is herein disclosed.

It is an object of my invention to provide means of extremely simple construction for correcting phase differences between two rotating members usually located at stations remote from each other, where phase correction is accomplished by referring the local control of one rotating member to the received intelligence signal elements.

It is another object of my invention to provide a motor stator orienting device which may be actuated through a clutch and a gear train connected to the armature shaft of the motor itself, thus avoiding the necessity for the provision of a phasing motor, or magnetically operated pawl-and-ratchet drive for orientation.

Still another object of my invention is to avoid over-correction when the departure of the local distributor from true phase relation to the incoming signals is so great as to cause a repetition of the correcting impulses.

Still another object is to avoid over-correction due to the reception of static impulses or other spurious and distorted signals.

In carrying out my invention I arrange for the actuation of the stator of the motor to shift its angular position by a definite number of degrees of arc whenever correction is necessary and to produce this effect in response to a single correcting impulse, irrespective of the number of impulses which may be applied in performing the phase correcting function at any one instance of phase departure.

My invention will now be described in more detail, reference being made to the accompanying drawing wherein Fig. 1 shows a combination of elements including a distributor, a distributor driving motor, a gear train, a clutch and a circuit for actuating the clutch, all as will be explained in the detailed description to follow; and Fig. 2 shows, partly in cross section, a view of a preferred embodiment of the invention, including a distributor motor, a gear train and a clutch for controlling the orientation of the motor stator.

Referring to Fig. 2, a motor stator frame 1 is rotatably mounted on fixed bearings 3 and 3a which are supported by a motor cradle 21. At one end of the motor frame slip rings 4 are provided for applying driving power to the motor. Brushes 4a are conventionally shown and it will be understood that three of these brushes are sufficient for driving the motor from a three-phase power source. If it is desired to drive the motor from a single-phase source one of the slip rings 4 and brushes 4a may be omitted.

At the other end of the motor frame with respect to the slip rings the armature shaft 11 is extended and is coupled mechanically to the brush shaft 50 of a distributor 40 (Fig. 1). Any conventional distributor such as is used in multiplex telegraphy will be understood to be an illustrative means of utilization of the motor drive. A set of distributor rings 41, 42, 43, 44 and associated brushes is shown in developed form (Fig. 1) for purposes of explaining the operation of my novel system.

A pinion gear 10 is fastened to the armature shaft 11 and is arranged to mesh with a gear 12 which is mounted for free rotation on a shaft 18, the latter being journaled in ball bearings 20 and 20a. These ball bearings are supported by portions 3b of the motor cradle 21.

Fastened to the shaft 18 and rotatable therewith are two members, namely, a pinion gear 17 and a disk 14. The disk 14 supports a pawl 15 which is pivotedly mounted thereon at 16. A spring 23 urges the pawl toward the center of the shaft 18 and provides a clutching action with a ratchet wheel 13 which is made integral with the gear 12.

Gear 5 is frictionally mounted between two clutch discs 6a on the hub 2, the latter being firmly attached to the motor stator frame. The purpose of the friction clutch is to provide facilities for manual setting of the motor stator, especially on starting up. Suitable compression is obtained in the friction clutch assembly against the sides of the gear 5 by means of a helical spring 7 which is compressed between the flange 6 and a washer 8. This washer is held in place by means of nuts 9 screwed onto the threaded end of the hub member 2.

A positive clutch release magnet 19 is positioned so that its armature 24 may operate to disengage itself from a heel piece of the pawl 15. A spring 25 draws the armature 24 away from the pole piece of the magnet 19 when the magnet is de-energized.

The disk 14 is notched at one part of its periphery in order to be held by a detent 26 after it has completed each single revolution. A suitable spring bias on the detent produces a slight amount of rotation of the disk 14 as the pawl 15 is being lifted out of engagement with the ratchet wheel 13 by contact of its heel piece with the armature 24. Thus the pawl 15 is caused to be lifted fully clear of the ratchet teeth.

The multiplex signals transmitted from a distant point arrive over a line L and pass through a relay 30 which is here shown as a polar relay. The line circuit after traversing the winding of relay 30 is grounded. It may be considered, by way of example, that the signals are of the plus-and-minus type; hence the preference for a polar relay 30. It will, of course, be understood, however, that an ordinary relay may be used when the incoming signal energy is keyed on-and-off. The tongue 32 of relay 30 is connected through a resistor 33 to a source of power here indicated by a plus (+) sign, it being understood that this source has its negative terminal grounded. The tongue 32 swings without bias from one side to the other in accordance with the reception of positive and negative impulses constituting the code signals. The marking contact 35 is connected to ground through the coil of a relay 37 in series with a resistor 27. This resistor renders the relay slow-to-operate to a desired degree. The marking contact 35 is also connected to the tongue 38 of this relay, normally engaging contact 39 which is connected to the solid local ring 41 of the multiplex distributor 40. A portion only of the distributor 40 is shown and it will be understood that it may be designed to distribute the impulses of code signals which are multiplexed for any number of channels.

The distributor 40 has in addition to the ring 41 a segmented local ring 42, a solid ring 43 and a segmented signal ring 44. The distributor arm 45 has a pair of conductively connected brushes 46 and 47, and another pair 48 and 49. The brush pair 46, 47 is insulated from the brush pair 48, 49. The segments of the rings 42 and 44 subtend equal arcs. A dot and dash line 50 is shown to indicate a shaft on which the brush holder 45 is mounted. This shaft is concentric with the armature shaft 11 of the motor, provided the motor speed does not have to be geared down to a desired brush holder speed.

The segments of the signal ring 44 are preferably about half the length of the signal pulses 51 which are shown in a graph S at the top of Fig. 1 of the drawing. Alternate segments 52 are connected individually to different code interpreting magnets of a printing or recording apparatus. Such printing or recording apparatus is not shown since it is not an essential part of the invention. Segments intervening between the active segments 52 may be considered as idle or dead so far as they have any utility in the instant invention, although they may be used for other purposes.

The segmented local ring 42 has as many segments as there are segments in the signal ring 44. Alternate segments $a$ in ring 42 are joined together electrically. The intervening segments are isolated and to all intents and purposes may be considered as insulation segments. The active segments $a$ in ring 42 are in radial alignment with active segments 52 in ring 44. The result of this arrangement is to normally detect the central portion only of the marking and spacing signal elements of baud unit length, but the leading edge of each marking signal is intended to arrive under conditions of correct phase adjustment while brush 47 traverses an idle segment in ring 42. If, therefore, the normal motor speed is less than the requirements for maintaining synchronism with the incoming signals, there will be a retrograde drift of the brush 47 into contact with a segment $a$ at the time of arrival of the leading edge of a marking pulse. The resultant actuation of the phase corrector will presently be described in more detail.

The segments $a$ are connected through the winding of a slow-release relay 55 to ground. Preferably the relay 55 has a copper ring surrounding its winding for producing a slow release effect, although other types of slow release relay may be employed if desired. The slow release operation serves the purpose of supplying an impulse of sufficient duration to build up the magnetic field in magnet 19 for operating the latter effectively.

Relay 37 operates as a circuit breaker and in such manner that current flows through the winding of relay 55 for a predetermined time interval whenever phase correction becomes necessary. During this interval a circuit is closed from ground through the front contact and armature 54 of relay 55, and thence through the winding of the clutch actuating magnet 19 to the positive terminal of the power supply source.

Mode of operation

When a correcting pulse is allowed to actuate the relay 55 by virtue of the departure from phase of the brush arm 45, then magnet 19 becomes momentarily energized and withdraws its armature 24 from engagement with the pawl 15. This pawl is then picked up by a tooth on the ratchet wheel 13, the latter being driven constantly through the gears 10 and 12. The disk 14 now rotates with the ratchet wheel 13 through one complete revolution. The gear 5 is driven through a certain arc determined by the gear ratio between the pinion 17 and the gear 5. This causes the stator frame of the motor 1 to be reoriented. During the single revolution of the disk 14 and the pinion 17 the brush arm 45 may cause the brush 47 to sweep over several segments $a$ of the distributor ring 42. The repeated pulses applied to relay 55 will, however, have no effect because the amount of correction is limited to the arc of orientation provided by a single operation of the positive clutch 13—15. Thus, it will be seen that although the phase drift of the distributor arm 45 may cause the magnet 19 to receive a number of phase correcting pulses in rapid succession, only one pulse becomes effective for engaging the pawl 15 with the ratchet wheel 13. The immediately following pulses occur while the shaft 18 is making a single revolution.

From the foregoing it will be seen that the amount and frequency of phase correction may be definitely predetermined through the selection of gear ratios as between gears 10 and 12 and between gears 17 and 5, thus greatly reducing the liability of the system to over-correct in response to spurious signals.

As soon as the phase corrector has operated to re-orient the stator of the motor, the brush 47 will again traverse idle segments intermediate or between the active segments a at the arrival times of the leading edges of the marking elements. The impulses applied to the segments a are of very brief duration because of the action of relay 37 which breaks contact between its armature 38 and the back contact 39. A maximum duration of circuit closure through the armature 32 and its contact 35 and thence through relay armature 38 and its back contact 39 to the solid ring 41 is calculated to be substantially co-extensive with the passage of brush 47 over a predetermined fractional part of a segment a for producing dependable phase correction.

The gear train as herein illustrated is suitable for phase correction in cases where the normal speed of the motor 1 produces a retrograde phase drift, and the stator has to be rotated forward with respect to the direction of rotation of the armature in order to restore the proper phase. Obviously a different gear train may be provided where the normal motor speed produces a forward phase drift.

It will be apparent to those skilled in the art that this invention may be practiced without necessarily adhering closely to the arrangement of gears as herein shown and described. Spiral gears or bevel gears may be substituted for spur gears if for any reason it should be found more convenient to so mechanically intercouple the armature shaft 11 and the hub 2 on the motor stator. Other modifications will also suggest themselves to those skilled in the art without departing from the spirit and scope of the invention.

I claim:

1. A device for use in correcting the phase of a distributor, comprising a driving motor for the brush arm of said distributor, a motor cradle having bearings in which the motor stator is mounted for rotation on an axis concentric with that of its armature, a gear train constantly driven by the armature shaft of said motor, a normally inactive gear train mechanically coupled to the stator of said motor, a counter-shaft for supporting gear members of the two said gear trains, and electromagnetically controlled clutching means having one coacting member thereof coupled to said normally inactive train and its other coacting member coupled to said constantly driven train, said means being operable to interlock the gear members on said countershaft while they make a single revolution, thereby to cause rotation of the motor stator through a predetermined angle, said clutching means being responsive to phase departures of said distributor in relation to a train of incoming signals.

2. A device in accordance with claim 1 and including a correcting relay circuit arranged and adapted to operate under control of signal pulses as applied to certain segments of said distributor, said circuit having relay means for limiting the time intervals of pulse effectiveness in performing the phase correcting function, and said circuit constituting means for controlling said clutching means.

3. A phase corrector for a rotary distributor of the type wherein a brush sweeps over a stationary ring of segmented contacts, said corrector comprising a motor the field shell and armature of which are both rotatable on a common axis, axial means mechanically coupling said brush to said armature, apparatus inducting gear-and-clutch means for causing said axial means to rotate said field shell through a predetermined arc when the clutch is engaged, thereby to re-orient the field, means operative on the completion of said rotation for disengaging said clutch, circuit means for producing correction pulses in response to phase departures of said brush from proper time coordination with a train of incoming signal pulses, and electromagnetic means operable through said circuit means for causing said gear-and-clutch means to effect said re-orientation, thereby to restore the proper phase of said brush.

4. In phase correction for multiplex telegraph systems, a phase correcting circuit operable to re-orient the field of a motor which serves to drive the brushes of a rotary distributor, said circuit including signal pulse responsive means operable only once during a predetermined time interval following the occurrence of distributor brush phase departure to a predetermined extent, a gear train permanently connected to the armature shaft of said motor, a second gear train permanently connected to the field shell of said motor, electromagnetically controlled clutch means for mutually engaging the two gear trains, the last said means being subject to control by said phase correcting circuit, and apparatus operative on rotation of the gear train through a predetermined arc for acting through said clutch means to disengage said two gear trains.

5. A device in accordance with claim 4 wherein a countershaft is provided for supporting two gears which are respectively associated with one and the second of said gear trains, and wherein said clutch means is rotatable on said countershaft and includes a ratchet-and-pawl mechanism of the type wherein a magnet releases the pawl so as to be engaged with the ratchet, and wherein said last named apparatus includes means for disengaging said pawl upon return thereof to a homing position after rotation through a single cycle.

6. In a device for accelerating the rotation of a distributor brush about the face-plate of a segmented distributor, where acceleration is required from time to time in order to maintain a proper phase relation between said brush and the arrival times of certain incoming signal pulses, a motor having an armature shaft connected to said brush, a gear train driven by said shaft, means for swiveling the field shell of said motor coaxially with respect to said shaft, a gear train for orienting said field shell, signal-responsive means operable upon phase departure of said brush for clutching together the two said gear trains, and means automatically effective for de-clutching said trains upon completion of a single cycle of certain gear members of the two trains which are coaxial.

7. A system for maintaining a local device in synchronism with the periodic reception of signal elements, comprising, in combination, means for producing impulses in response to a predetermined departure of said device from synchronism, a motor having an orientable field and an armature, the shaft of said armature being connected to said device for operating the same, means associated with said shaft including a gear-and-clutch mechanism for causing rotation of said field by means of the driving power of said shaft through a predetermined arc in a direction suitable for restoring synchronism, an electromagnetic means juxtaposed to said gear-and-clutch mechanism for controlling the same by the utilization of said impulses, and mechanical apparatus associated with said gear-and-clutch mechanism for limiting rotation of the field to said predetermined arc to prevent over-compensation.

8. A device for use in correcting the phase of a distributor, comprising a driving motor for the brush arm of said distributor, a motor cradle having bearings in which the motor stator is mounted for rotation on an axis concentric with that of its armature, a gear train constantly driven by the armature shaft of said motor, a normally inactive gear train mechanically coupled to the stator of said motor, a countershaft for supporting gear members of the two said gear trains, an electromagnetically controlled clutching means having one coacting member thereof coupled to said normally inactive train and its other coacting member coupled to said constantly driven train, said means being operable to interlock the gear members on said countershaft for a limited time period sufficient to cause rotation of the motor stator through the desired angle, said clutching means including means for disengaging said gear members on the completion of said time period, and means for producing a pulse to operate said electromagnetically controlled clutching means when the phase of said distributor is incorrect.

9. In a mechanism for maintaining a desired phase relation between a signal comprising recurring pulses and a distributor brush, a motor having a field winding on a support and a rotor for positioning said brushes, a gear train including a clutch between the rotor and the field winding support, apparatus automatically operative in the presence of change in said desired phase relation for engaging said clutch, said apparatus being automatically operative on completion of a predetermined period of the cycle of the engaged gear train to disengage said clutch.

10. A mechanism as recited in claim 9 wherein said apparatus includes means for producing a pulse of energy when said phase relation recited above is not as desired, a magnetic relay excited by said pulse, and ratchet mechanism actuated by the armature of said last named relay for engaging said clutch.

JAMES A. SPENCER.

REFERENCES CITED

The following references are of record in the file of this patent:

UNITED STATES PATENTS

| Number | Name | Date |
|---|---|---|
| 522,241 | Thomson | July 3, 1894 |
| 2,038,375 | Mathes | Apr. 21, 1936 |
| 2,111,153 | Nichols | Mar. 15, 1938 |
| 2,212,447 | Mathes | Aug. 20, 1940 |
| 2,230,435 | Potts | Feb. 4, 1941 |
| 2,249,435 | Potts | July 15, 1941 |
| 2,288,257 | Spencer | June 30, 1942 |
| 2,292,783 | Haglund | Aug. 11, 1942 |
| 2,329,077 | Nichols | Sept. 7, 1943 |
| 2,357,671 | Latimer | Sept. 5, 1944 |